(12) United States Patent
Marutani et al.

(10) Patent No.: US 8,905,752 B2
(45) Date of Patent: Dec. 9, 2014

(54) BURNER APPARATUS

(75) Inventors: Youichi Marutani, Odawara (JP);
Yasunori Ashikaga, Yokohama (JP);
Syouji Itoh, Tokyo (JP); Akihiko Ogasawara, Azumino (JP); Mamoru Kurashina, Matsumoto (JP)

(73) Assignee: IHI Corporation (JP)

( * ) Notice: Subject to any disclaimer, the term of this patent is extended or adjusted under 35 U.S.C. 154(b) by 139 days.

(21) Appl. No.: 13/383,630

(22) PCT Filed: Jul. 14, 2010

(86) PCT No.: PCT/JP2010/061917
§ 371 (c)(1),
(2), (4) Date: Jan. 12, 2012

(87) PCT Pub. No.: WO2011/007809
PCT Pub. Date: Jan. 20, 2011

(65) Prior Publication Data
US 2012/0107755 A1 May 3, 2012

(30) Foreign Application Priority Data

Jul. 14, 2009 (JP) .............................. P2009-165870
Sep. 30, 2009 (JP) .............................. P2009-226714

(51) Int. Cl.
*F23D 11/00* (2006.01)
*F01N 3/025* (2006.01)
*F23M 9/06* (2006.01)
*F23Q 7/10* (2006.01)

(52) U.S. Cl.
CPC *F23Q 7/10* (2013.01); *F01N 3/025* (2013.01); *F23M 9/06* (2013.01); *F23D 2900/21003* (2013.01); *F01N 2240/14* (2013.01)
USPC ........................................................ 431/159

(58) Field of Classification Search
CPC ..... F01N 3/025; F01N 3/0253; F01N 3/0256;
F01N 3/2033; F01N 3/2892; F01N 2610/107;
F01N 2240/14; F01N 2240/20; F23M 9/06;
F23Q 7/10; F23D 2900/21003
USPC ............ 431/263, 249, 159; 60/311, 303, 288, 60/274, 272, 309, 324
See application file for complete search history.

(56) References Cited

U.S. PATENT DOCUMENTS 3,829,281 A * 8/1974 Briggs et al. ..................... 432/63
4,538,413 A * 9/1985 Shinzawa et al. ............... 60/303
(Continued)

FOREIGN PATENT DOCUMENTS

CN 101163921 A 4/2008
JP U-60-058810 4/1985
(Continued)

OTHER PUBLICATIONS

Korean Non-Final Office Action and English translation dated Apr. 15, 2013 issued in corresponding Korean Application No. 10-2012-7002063.
(Continued)

*Primary Examiner* — Kenneth Rinehart
*Assistant Examiner* — Jason Lau
(74) *Attorney, Agent, or Firm* — Ostrolenk Faber LLP (57) ABSTRACT

This burner apparatus (S1) includes: an ignition system (7) including a heating portion (7a, 7c) which heats air-fuel mixture to its ignition temperature or more; and a windbreak device (10) placed around the heating portion (7a, 7c) apart from the heating portion (7a, 7c), and configured to reduce a flow speed of fluid (X) which is supplied to the heating portion (7a, 7c). According to the burner apparatus (S1), it is possible to improve the ignition performance of the ignition system, and to also generate high-temperature gas stably.

2 Claims, 6 Drawing Sheets (56) References Cited

U.S. PATENT DOCUMENTS

| | | | | |
|---|---|---|---|---|
| 4,571,938 A * | 2/1986 | Sakurai | ............................ | 60/303 |
| 4,576,617 A * | 3/1986 | Renevot | ........................... | 95/279 |
| 4,623,310 A * | 11/1986 | Kimijima et al. | ............ | 431/261 |
| 4,662,172 A * | 5/1987 | Shinzawa et al. | ................ | 60/303 |
| 4,669,974 A * | 6/1987 | Sawada et al. | ................. | 431/154 |
| 4,703,888 A * | 11/1987 | Kawamura et al. | ........... | 237/2 A |
| 5,320,523 A * | 6/1994 | Stark | .............................. | 431/353 |
| 6,777,650 B1 | 8/2004 | Hamel | | |
| 7,735,315 B2 * | 6/2010 | Bareis et al. | ..................... | 60/303 |
| 7,786,409 B2 | 8/2010 | Hamel et al. | | |
| 2005/0150214 A1 | 7/2005 | Crawley | ........................... | 60/295 |
| 2008/0092532 A1 * | 4/2008 | Bareis et al. | ..................... | 60/303 |
| 2010/0146942 A1 * | 6/2010 | Mayr et al. | ....................... | 60/286 |

FOREIGN PATENT DOCUMENTS

| | | |
|---|---|---|
| JP | 63-47964 | 9/1988 |
| JP | 3-025865 | 3/1991 |
| JP | A-04-151406 | 5/1992 |
| JP | 4-073739 | 6/1992 |
| JP | 5-039923 | 2/1993 |
| JP | 8-260944 | 10/1996 |
| JP | 2683108 | 8/1997 |
| JP | 2007-146700 | 6/2007 |
| JP | 2007-154772 | 6/2007 |
| JP | A-2008-025588 | 2/2008 |
| JP | A-2009-092015 | 4/2009 |
| KR | 10-0622135 B1 | 9/2006 |

OTHER PUBLICATIONS

International Search Report and Written Opinion mailed Aug. 24, 2010 in corresponding PCT International Application No. PCT/JP2010/061917.
Office Action dated Jul. 16, 2013 issued in corresponding Japanese Patent Application No. 2009-226714 with English translation.
European Search Report, dated Jan. 16, 2014, issued in corresponding European Application No. EP10799867.6. Total 5 pages.
Notice of Reasons for Rejection dated Oct. 15, 2013 issued in corresponding Japanese Patent Application No. 2009-226714 (with English translation).
Search Report dated Nov. 6, 2013 issued in corresponding People's Republic of China Patent Application No. 201080031394.7 (with English translation of Search Report).

* cited by examiner

BURNER APPARATUS

CROSS-REFERENCE TO RELATED APPLICATIONS

The present application is a 35 U.S.C. §§371 national phase conversion of PCT/JP2010/061917, filed Jul. 14, 2010, which claims priority of Japanese Patent Application No. 2009-165870, filed Jul. 14, 2009, and Japanese Patent Application No. 2009-226714, filed Sep. 30, 2009, the contents of which are incorporated herein by reference. The PCT International Application was published in the Japanese language.

TECHNICAL FIELD

The present invention relates to a burner apparatus that combusts air-fuel mixture of an oxidizing agent and fuel.

TECHNICAL BACKGROUND

Minute particles (particulate matter) are contained in exhaust gas from a diesel engine or the like. The adverse effects on the environment when the minute particles are discharged into the atmosphere are a cause for serious concern. As a consequence, in recent years, a filter which is used to remove the minute particles from the exhaust gas (DPF) has been mounted on vehicles powered by the diesel engine or the like.

This filter is formed of ceramics or the like that are porous material which is provided with a plurality of holes which are smaller than the minute particles. This filter obstructs the passage of the minute particles, and collects the minute particles.

However, when the filter like this has been used for a prolonged period, the collected minute particles are accumulated therein and the filter becomes clogged.

In order to prevent the filter like this from becoming clogged, for example, as is shown in Patent Document 1, the method is used in which high-temperature gas is supplied to the filter so that the collected minute particles in the filter are burned and removed.

Specifically, in Patent Document 1, a burner apparatus is placed between the diesel engine and the filter. Air-fuel mixture in which exhaust gas and fuel were mixed is combusted in the burner apparatus so as to generate high-temperature gas. The minute particles are burned by supplying this high-temperature gas to the filter.

DOCUMENTS OF THE PRIOR ART

Patent Documents

[Patent Document 1] Japanese Patent Application, First Publication No. 2007-154772

DISCLOSURE OF THE INVENTION

Problems to be Solved by the Invention

In the above-described burner apparatus, fuel which is injected from a fuel injection system is mixed together with exhaust gas or the outside air which is supplied as an oxidizing agent so as to generate air-fuel mixture. This air-fuel mixture is heated to its ignition temperature or more by an ignition system, thereby the air-fuel mixture is ignited and combusted.

However, in the burner apparatus, in general, a glow plug or a spark plug is used as the ignition system and ignites the air-fuel mixture by very small heat generating area. Thus, a burner apparatus in the prior art has problems in which a formed flame kernel is small, the flame kernel is blown off not to grow if a flow speed of fluid around the heat generating area is high, and ignition performance thereof is low.

The present invention was conceived in view of the above-described problems, and it is an object thereof to provide a burner apparatus that is able to improve the ignition performance of the ignition system, and to also generate high-temperature gas stably.

Means for Solving the Problem

The present invention employs the following structure as a means of solving the above-described problems.

The first aspect of the present invention, as a burner apparatus that combusts air-fuel mixture of an oxidizing agent and fuel, employs the structure in which the burner apparatus includes: an ignition system including a heating portion which heats the air-fuel mixture to its ignition temperature or more; and a windbreak device placed around the heating portion apart from the heating portion, and configured to reduce a flow speed of fluid which is supplied to the heating portion.

The second aspect of the present invention may employ the structure in which, in the above first aspect of the present invention, the windbreak device is a wall member surrounding an entire circumference of the heating portion, and the center of the wall member corresponds to the heating portion.

The third aspect of the present invention may employ the structure in which, in the above first or second aspect of the present invention, the wall member is provided with through-holes.

The fourth aspect of the present invention may employ the structure in which, in the above second or third aspect of the present invention, a part of the heating portion in the side of a combustion chamber where combustion of the air-fuel mixture is maintained is placed to protrude from the wall member toward the combustion chamber.

The fifth aspect of the present invention may employ the structure in which, in any one of the above first through fourth aspects of the present invention, the heating portion includes: a heat generating source configured to generate heat; and an auxiliary heating portion which is heated by the heat generating source to the ignition temperature or more and placed around the heat generating source.

The sixth aspect of the present invention may employ the structure in which, in any one of the above first through fifth aspects of the present invention, the burner apparatus further includes a partition member separating an ignition chamber where the heating portion is placed from a combustion holding chamber where combustion of the air-fuel mixture is maintained, so that the air-fuel mixture is able to pass between the ignition chamber and the combustion holding chamber, wherein the windbreak device is a plate member supported by the partition member.

Effects of the Invention

According to the present invention, a flow speed of fluid which is supplied to the heating portion is reduced by the windbreak device. Thus, it is possible to prevent a flame kernel formed by the heating portion from being blown off, and to grow the flame kernel.

Therefore, according to the present invention, it is possible to improve the ignition performance of the ignition system, and to also generate high-temperature gas stably.

EMBODIMENTS FOR IMPLEMENTING THE INVENTION

Hereinafter, an embodiment of a burner apparatus related to the present invention will be described with reference made to the drawings. Note that in the following drawings, the scales of respective components have been suitably altered in order to describe each component in a recognizable size.

First Embodiment

Figure 1:
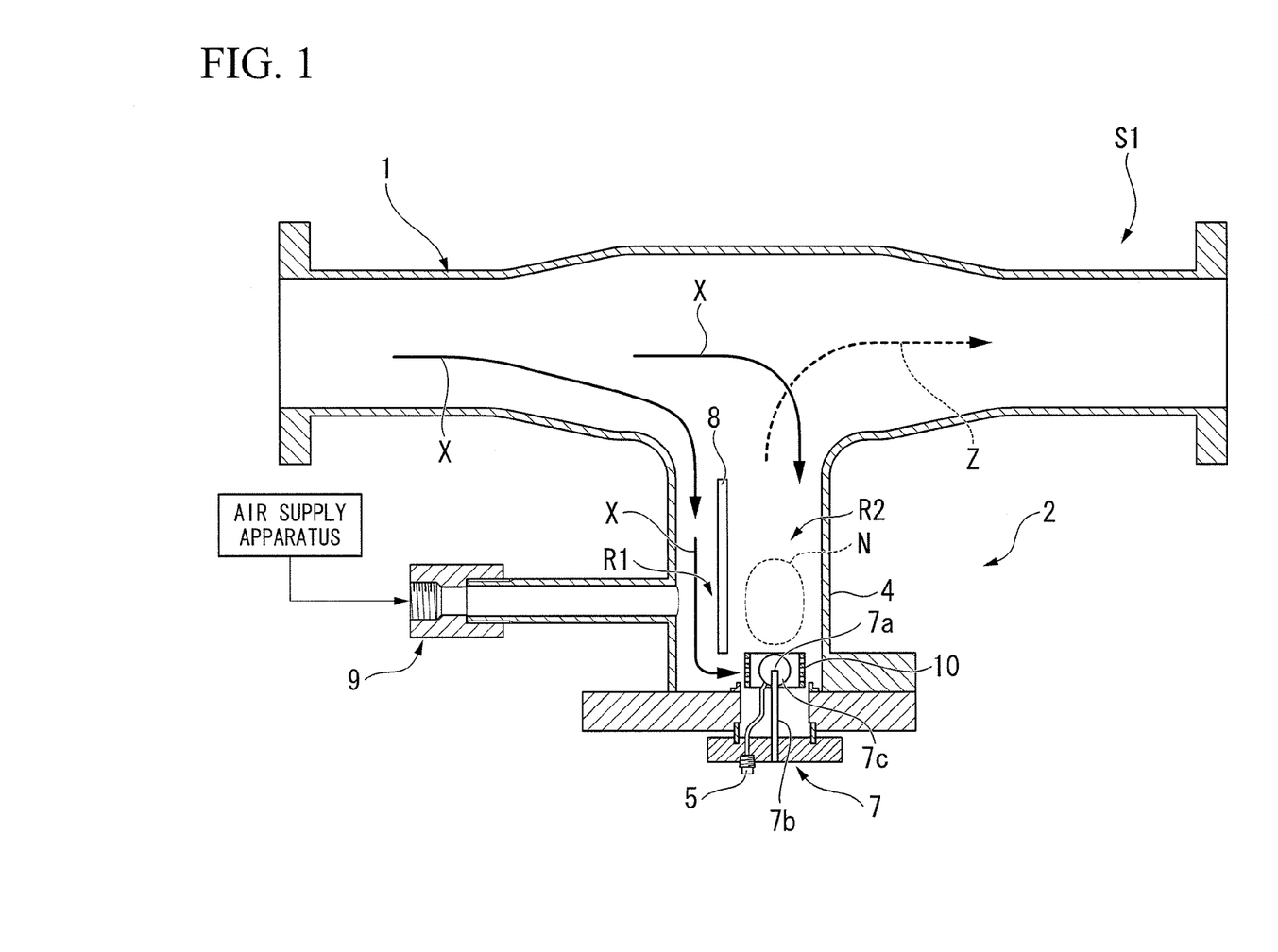
FIG. 1 is a cross-sectional view showing the schematic structure of a burner apparatus of the first embodiment of the present invention.

FIG. 1 is a cross-sectional view showing the schematic structure of a burner apparatus S1 of the present embodiment.

This burner apparatus S1 is connected to an exhaust outlet of an apparatus that expels exhaust gas such as a diesel engine or the like which is located on the upstream side of the burner apparatus S1. The burner apparatus S1 mixes together supplied exhaust gas X (i.e., an oxidizing agent) and fuel, and then combusts them so as to generate high-temperature gas Z. It also supplies the high-temperature gas Z to a downstream-side filter (a particulate filter). This burner apparatus 51 is located, for example, between the diesel engine and the particulate filter.

This burner apparatus S1 is provided with a supply flow path 1 and a combustion unit 2.

The supply flow path 1 is a flow path which is used to supply the exhaust gas X, which is supplied from the diesel engine or the like, directly to the filter. The supply flow path 1 is formed of a circular cylinder-shaped pipe. One end portion of the supply flow path 1 is connected to an exhaust outlet of the diesel engine or the like, while the other end portion thereof is connected to the filter.

The combustion unit 2 is connected to the supply flow path 1. The combustion unit 2 mixes together a part of the exhaust gas X which flows through the supply flow path 1 and fuel therein, and then combusts them so as to generate high-temperature gas. This combustion unit 2 is provided with a pipe body 4, a fuel supply portion 5, an ignition system 7, a partition member 8, a combustion supporting air supply apparatus 9, and a windbreak cover 10 (i.e., a windbreak device).

The pipe body 4 is a pipe-shaped member which forms the outer shape of the combustion unit 2, and has a hollow interior. The pipe body 4 is connected to the supply flow path 1 in an orthogonal direction relative to the direction in which the supply flow path 1 extends. Additionally, in the following description, the direction in which the pipe body 4 extends in FIG. 1 is defined as a vertical direction.

The fuel supply portion 5 is configured to supply fuel to a auxiliary heating portion 7c which is placed at a tip section 7a of a glow plug 7b provided on the ignition system 7. The glow plug 7b is described later.

The ignition system 7 includes the glow plug 7b which heats the air-fuel mixture to its ignition temperature or more and in which the tip section 7a thereof is a heat generating source. The ignition system 7 further includes the auxiliary heating portion 7c which is placed around the tip section 7a.

The glow plug 7b is configured so that the tip section 7a is heated to the ignition temperature of the air-fuel mixture or more under the control of a control system (not shown).

In addition, the auxiliary heating portion 7c is heated to the ignition temperature or more by the tip section 7a of the glow plug 7b, and includes internal space (for example, a plurality of minute holes) where fuel supplied from the fuel supply portion 5 is kept. This auxiliary heating portion 7b can be formed of, for example, wire mesh, sintered metal, metal fiber, glass fiber fabric, porous ceramics, ceramic fiber, pumice or the like.

In the ignition system 7 like this, the air-fuel mixture is heated to its ignition temperature or more by both the tip section 7a of the glow plug 7b and the auxiliary heating portion 7c. That is, in the present embodiment, the heating portion of the present invention is configured by the tip section 7a of the glow plug 7b and the auxiliary heating portion 7c.

The partition member 8 partitions the interior of the pipe body 4 into an exhaust gas flow path R1 through which the exhaust gas X introduced from the supply flow path 1 flows, and an ignition chamber R2 where the ignition system 7 is placed.

This partition member 8 is placed in the central area of the pipe body 4, and extends along the extending direction of the pipe body 4 (i.e., the vertical direction). The tip end (i.e., the lower end) of the partition member 8 is placed apart from a bottom surface of the pipe body 4. As is shown in FIG. 1, the partition member 8 is configured to allow the exhaust gas X to flow from the exhaust gas flow path R1 to the ignition chamber R2 through a gap between the partition member 8 and the bottom surface of the pipe body 4.

The combustion supporting air supply apparatus 9 accessorily supplies air to the interior of the pipe body 4 (i.e., to the exhaust gas flow path R1) as necessary. The combustion supporting air supply apparatus 9 is provided with an air supply device which supplies air, and with piping or the like which connects this air supply device to the interior of the pipe body 4.

Figure 2:
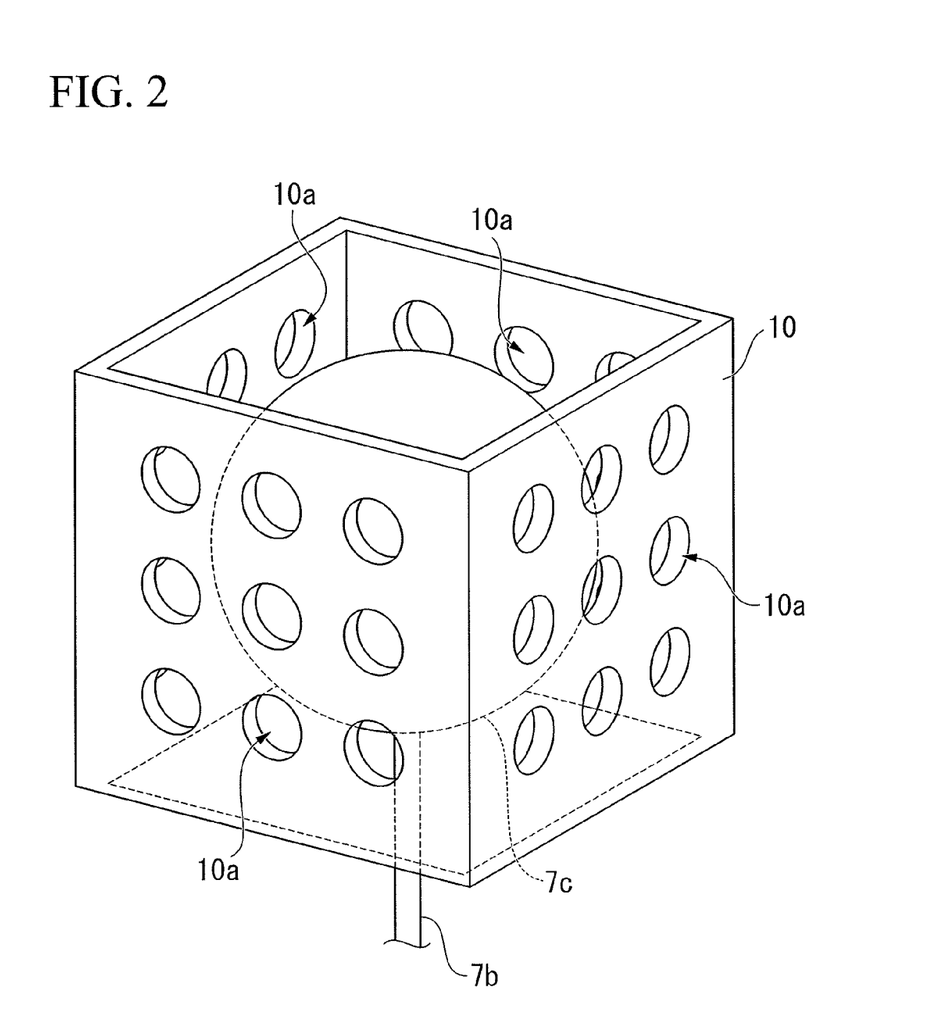
FIG. 2 is an expanded perspective view including an auxiliary heating portion provided on the burner apparatus of the first embodiment of the present invention.

As is shown in FIG. 2 as a expanded view, the windbreak cover 10 is placed around both the tip section 7a of the glow plug 7b and the auxiliary heating portion 7c, apart from both the tip section 7a of the glow plug 7b and the auxiliary heating portion 7c, and is fixed to a inner wall of the pipe body 4 by a supporting member (not shown). A flow speed of the exhaust gas X (i.e., fluid) which is supplied to the tip section 7a of the glow plug 7b and the auxiliary heating portion 7c is reduced by the windbreak cover 10.

This windbreak cover 10 is formed of a wall member surrounding an entire circumference of both the tip section 7a of the glow plug 7b and the auxiliary heating portion 7c, and the center of the wall member corresponds to the tip section 7a of the glow plug 7b and the auxiliary heating portion 7c. Additionally, each wall member is provided with a plurality of through-holes 10a.

In the burner apparatus S1 configured like this of the present embodiment, the exhaust gas X is introduced from the supply flow path 1 to the exhaust gas flow path R1, and then supplied to the ignition chamber R2.

On the other hand, the tip section 7a of the glow plug 7b is heated under the control of the control system (not shown), and thereby the auxiliary heating portion 7c is heated to the ignition temperature of the air-fuel mixture or more. Fuel supplied from the fuel supply portion 5 to the auxiliary heating portion 7c is volatilized, and mixed together with the exhaust gas X so as to generate the air-fuel mixture. The air-fuel mixture is heated to the ignition temperature or more by the tip section 7a of the glow plug 7b and the auxiliary heating portion 7c, and is ignited.

When the air-fuel mixture is ignited like this in the ignition chamber R2, in a combustion chamber N, an uncombusted air-fuel mixture is combusted together with the exhaust gas X supplied from the upper side, combustion flames are maintained, and high-temperature gas Z is generated stably.

Here, in the burner apparatus S1 of the present embodiment, by the windbreak cover 10, the flow speed of the exhaust gas X which is supplied to the tip section 7a of the glow plug 7b and the auxiliary heating portion 7c is reduced. Thereby, it is possible to prevent a flame kernel formed by the tip section 7a of the glow plug 7b and the auxiliary heating portion 7c from being blown off, and to grow the flame kernel.

Therefore, according to the burner apparatus S1 of the present embodiment, it is possible to improve the ignition performance of the ignition system 7, and to also generate the high-temperature gas Z stably.

Additionally, in the burner apparatus S1 of the present embodiment, the windbreak cover 10 is formed of the wall member surrounding both the tip section 7a of the glow plug 7b and the auxiliary heating portion 7c.

Thereby, if the exhaust gas X is supplied from any position around the tip section 7a of the glow plug 7b and the auxiliary heating portion 7c, it is possible to reduce the flow speed of the exhaust gas X.

Besides, in the burner apparatus S1 of the present embodiment, the wall member forming the windbreak cover 10 is provided with the plurality of through-holes 10a.

Thereby, a part of the exhaust gas X which has hit the windbreak cover 10 flows into the interior of the windbreak cover 10. Therefore, it is possible to prevent the amount of oxygen in the windbreak cover 10 from decreasing, and to promote the growth of the flame kernel.

Furthermore, in the burner apparatus S1 of the present embodiment, the heating portion of the present invention is configured by both the tip section 7a of the glow plug 7b and the auxiliary heating portion 7c.

Thereby, it is possible to expand the heating area thereof compared with the case in which only the tip section 7a of the glow plug 7b is used as a heating portion, and to improve the ignition performance thereof.

Second Embodiment

Next, the second embodiment of the present invention will be described. Note that in the description of the present embodiment, any description of structure that is the same as in the above described first embodiment is either omitted or simplified.

Figure 3:
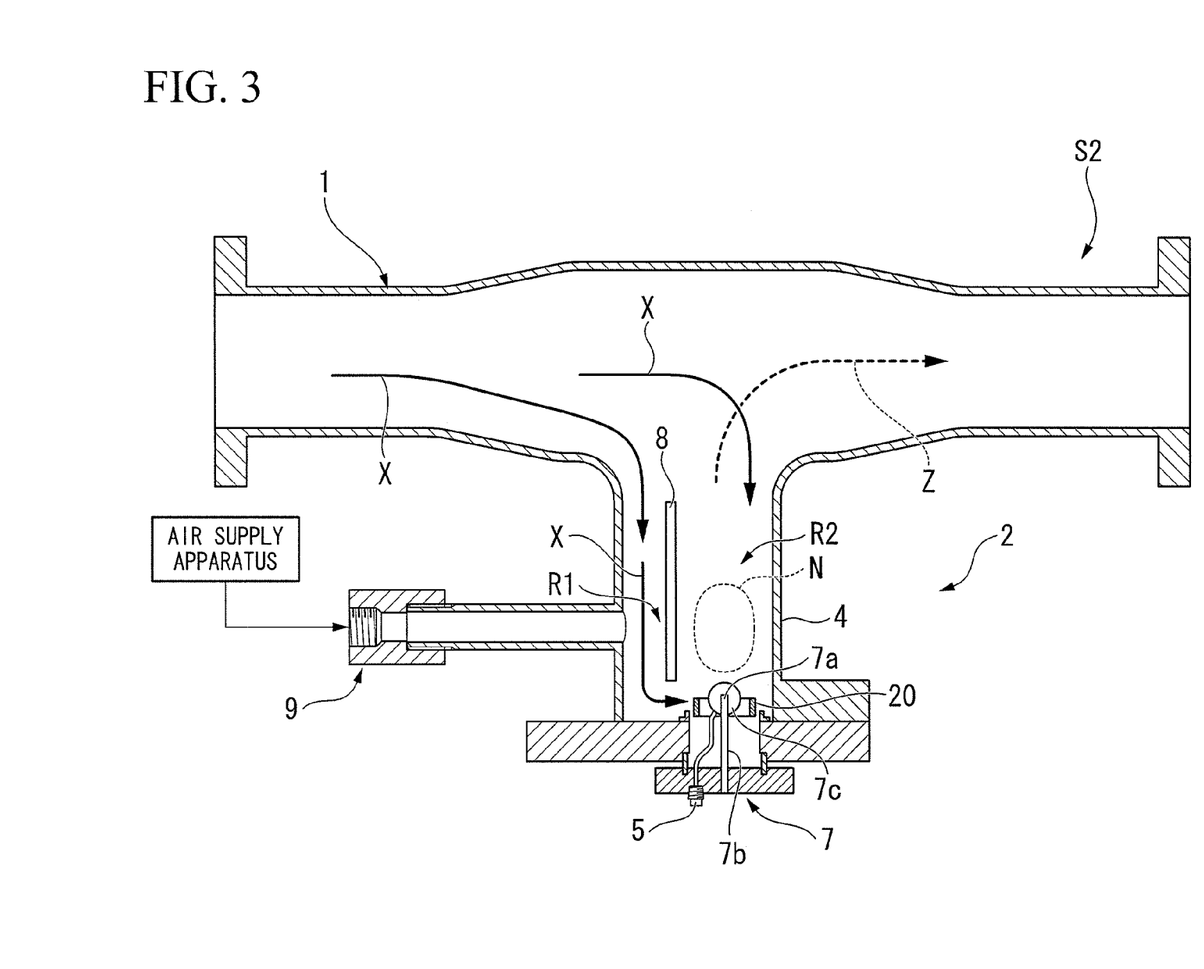
FIG. 3 is a cross-sectional view showing the schematic structure of a burner apparatus of the second embodiment of the present invention.
Figure 4:
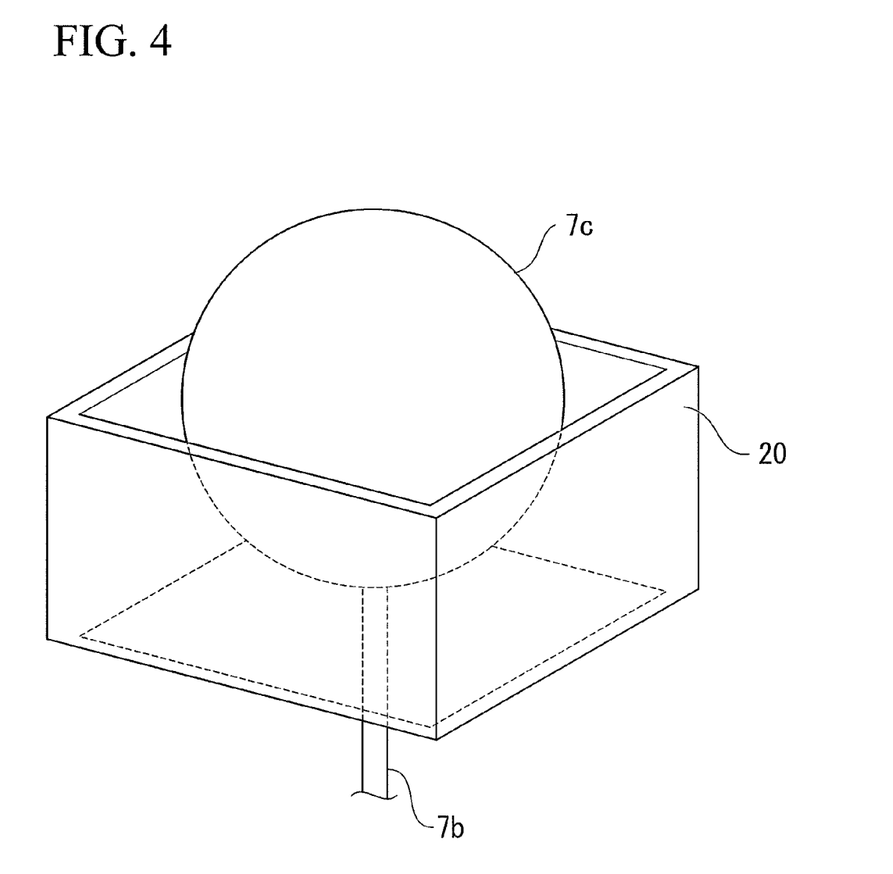
FIG. 4 is an expanded perspective view including an auxiliary heating portion provided on the burner apparatus of the second embodiment of the present invention.

FIG. 3 is a cross-sectional view showing the schematic structure of a burner apparatus S2 of the present embodiment. In addition, FIG. 4 is an expanded perspective view including the auxiliary heating portion 7c provided on the burner apparatus S2 of the present embodiment. As is shown in these figures, the burner apparatus S2 of the present embodiment includes a windbreak cover 20 whose height is about half of that of the auxiliary heating portion 7c.

That is, in the burner apparatus S2 of the present embodiment, a part of the auxiliary heating portion 7c in the side of the combustion chamber N is placed to protrude from the windbreak cover 20 (i.e., a wall member) toward the combustion chamber N.

According to the burner apparatus S2 of the present embodiment including the structure like this, a flow speed of the exhaust gas X in a lower area about the auxiliary heating portion 7c which is surrounded by the windbreak cover 20 is reduced. In contrast, a flow speed of the exhaust gas X in an upper area about the auxiliary heating portion 7c which is not surrounded by the windbreak cover 20 is not reduced and is maintained.

In the burner apparatus S2 of the present embodiment like this, a flame kernel is formed and grows in the vicinity of the lower area of the auxiliary heating portion 7c. Then, this flame kernel is exposed to a fast flow of the exhaust gas X in the vicinity of the upper area of the auxiliary heating portion 7c, and propagated to the combustion chamber N under surroundings which have a sufficient amount of oxygen.

Therefore, according to the burner apparatus S2 of the present invention, it is possible to promote the growth of the flame kernel, and to steadily propagate the flame kernel to the combustion chamber N.

Third Embodiment

Next, the third embodiment of the present invention will be described. Note that in the description of the present embodiment, any description of structure that is the same as in the above described first embodiment is either omitted or simplified.

Figure 5:
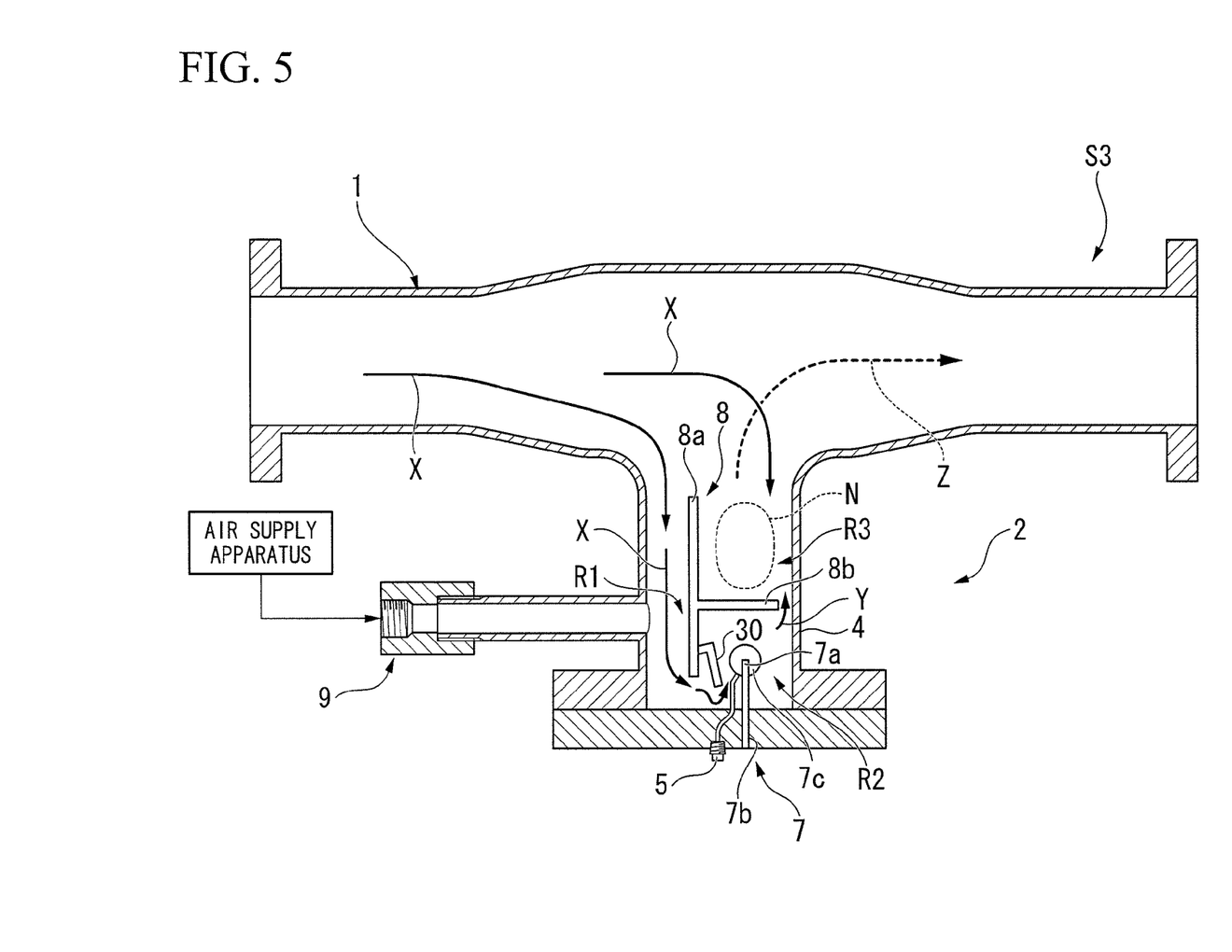
FIG. 5 is a cross-sectional view showing the schematic structure of a burner apparatus of the third embodiment of the present invention.

FIG. 5 is a cross-sectional view showing the schematic structure of a burner apparatus S3 of the present embodiment. As is shown in this figure, in the burner apparatus S3 of the present embodiment, the partition member 8 includes a central plate 8a which extends along the extending direction (i.e., the vertical direction) of the pipe body 4 in the central area of the pipe body 4, and a side plate 8b which extends from the central plate 8a along the extending direction of the supply flow path 1, that is, along the orthogonal direction (i.e., the horizontal direction) relative to the extending direction of the pipe body 4. The tip end (the lower end) of the central plate 8a is placed apart from a bottom surface of the pipe body 4. The tip end of the side plate 8b is placed apart from a side surface of the pipe body 4, and the side surface facing toward the side plate 8b. The partition member 8 partitions the interior of the pipe body 4 into the exhaust gas flow path R1 through which the exhaust gas X introduced from the supply flow path 1 flows, the ignition chamber R2 where the ignition system 7 is placed, and a combustion holding chamber R3 where combustion of the air-fuel mixture Y is maintained.

As is shown in FIG. 5, this partition member 8 is configured to allow the exhaust gas X to flow from the exhaust gas flow path R1 to the ignition chamber R2 through a gap between the central plate 8a and the bottom surface of the pipe body 4, and to allow the air-fuel mixture Y to flow from the ignition chamber R2 to the combustion holding chamber R3 through a gap between the side plate 8b and the side surface of the pipe body 4.

The partition member 8 like this is placed so that a gap is formed between the partition member 8 and the pipe body 4. The partition member 8 is configured to regulate the flow speed of the air-fuel mixture Y so as to stabilize combustion in the combustion holding chamber R3, by the air-fuel mixture Y flowing from the ignition chamber R2 to the combustion holding chamber R3 through the gap.

In addition, the partition member 8 is configured so that the air-fuel mixture Y flows from the lower side toward the upper side through the gap formed near the pipe body 4, and the air-fuel mixture Y hits a flow of the exhaust gas X (i.e., a flow of an oxidizing agent) which is supplied from an area above the combustion holding chamber R3 (i.e., the outside) along a wall surface of the pipe body 4 to the combustion holding chamber R3.

Furthermore, it is preferable that the flow passage area from the exhaust gas flow path R1 to the ignition chamber R2 is larger than the flow passage area from the ignition chamber R2 to the combustion holding chamber R3. Thereby, the ignition chamber R2 is always filled up with gas, a flow speed of fluid in the ignition chamber R2 is reduced, and the ignition performance thereof is improved.

The burner apparatus S3 of the present embodiment further includes a plate member 30 which is supported by the above partition member 8, as the windbreak device of the present invention.

An upper end portion of this plate member 30 is fixed to a lower end portion of the central plate 8a of the partition member 8. The plate member 30 is placed to extend obliquely downward from the upper end portion thereof. A lower end portion of the plate member 30 is placed between the gap and the placement area, the gap formed between the central plate 8a and the bottom surface of the pipe body 4, and the placement area where the tip section 7a of the glow plug 7b and the auxiliary heating portion 7c are placed. Furthermore, it is preferable that the lower end portion of the plate member 30 is placed to being spaced about 5 mm from the gap formed between the central plate 8a and the bottom surface of the pipe body 4.

According to the burner apparatus S3 of the present embodiment like this, the exhaust gas X does not directly hit the tip section 7a of the glow plug 7b and the auxiliary heating portion 7c, because the lower end portion of the plate member 30 changes the flow of the exhaust gas X. Consequently, it is possible to prevent a flame kernel formed by the tip section 7a of the glow plug 7b and the auxiliary heating portion 7c from being blown off and being cooled, and to grow the flame kernel.

Therefore, according to the burner apparatus S3 of the present embodiment, it is possible to improve the ignition performance of the ignition system 7, and to also generate the high-temperature gas Z stably.

Preferred embodiments of the present invention have been described above with reference made to the figures, however, the present invention is not limited to the above embodiments. The various configurations and combinations and the like of the respective component elements illustrated in the above described embodiments are merely examples thereof. Various modifications and the like to the present invention may be made based on the design requirements and the like insofar as they do not depart from the spirit or scope of the present invention.

For example, in the above described embodiments, the T-shaped burner apparatus was explained, in which the pipe body 4 is connected to the supply flow path 1 orthogonally. However, the present invention is not limited to this structure, and it is possible to apply the present invention to burner apparatuses including other structures.

Additionally, in the above described embodiments, the structure was explained, in which each the windbreak cover 10, 20 surrounds both the tip section 7a of the glow plug 7b and the auxiliary heating portion 7c.

However, the present invention is not limited to this structure, for example, it is possible to employ the structure in which a windbreak cover is placed at only one portion in the side of the exhaust gas flow path R1.

Additionally, in the above described embodiments, the structure was explained, in which each the windbreak cover 10, 20 has a rectangular shape in a plane view.

However, the present invention is not limited to this structure, and a windbreak cover may have other shape as a circular shape or the like in the plane view.

Additionally, in the above described embodiments, the structure was explained, in which the fuel supply portion 5 supplies fuel to the auxiliary heating portion 7c directly.

However, the present invention is not limited to this structure, and it is possible to employ the structure in which an injector sprays fuel so as to supply it to the auxiliary heating portion 7c.

Additionally, in the above described embodiments, the structure in which the combustion supporting air supply apparatus 9 is provided was employed. However, if the concentration of oxygen to be contained in the exhaust gas X is high enough, it is possible to omit the combustion supporting air supply apparatus 9.

Additionally, in the above described embodiments, the structure in which the exhaust gas X is used as an oxidizing agent was explained.

However, the present invention is not limited to this structure, and it is possible to use air as an oxidizing agent.

In the case like this, for example, the structure is employed, in which the end portion of the exhaust gas flow path R1 connected to the supply flow path 1 is closed, and air is supplied from the combustion supporting air supply apparatus 9 not secondarily but primarily as an oxidizing agent.

Figure 6:
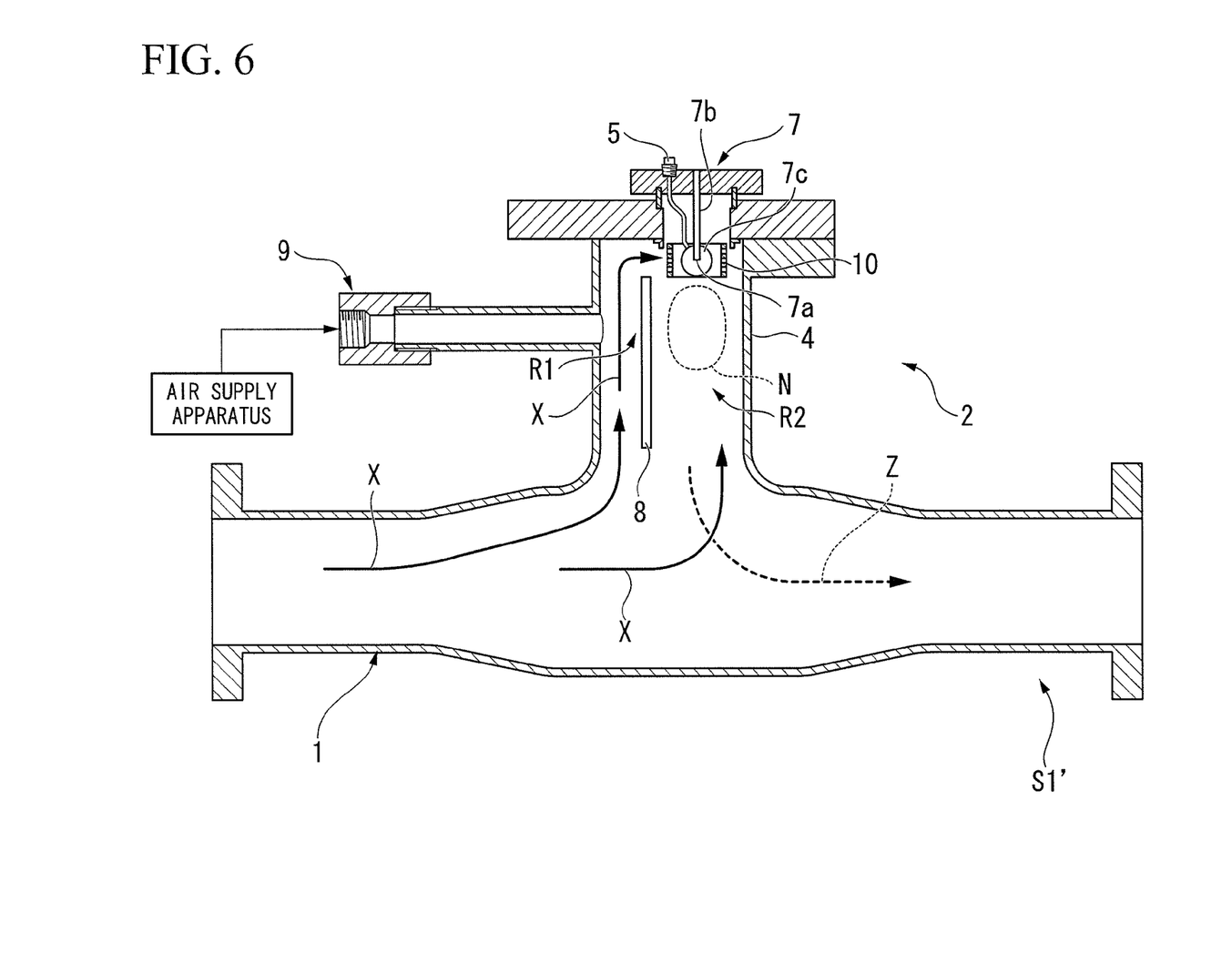
FIG. 6 is a cross-sectional view showing the schematic structure of a variant example of the burner apparatus of the first embodiment of the present invention.

Additionally, as is shown in FIG. 6, it is possible to employ the structure in which the internal structure and the connection structure of the pipe body 4 are placed in vertical symmetry relative to the structure shown in the above described first embodiment. When the structure like this is employed, the internal structure (the partition member 8, the fuel supply portion 5, the ignition system 7 and the like) and the connection structure (the combustion supporting air supply apparatus 9) of the pipe body 4 are installed on an upper portion of the supply flow path 1.

Furthermore, in the burner apparatus S1' in FIG. 6, the structure is employed and shown, in which the internal structure and the connection structure of the pipe body 4 are placed in vertical symmetry relative to the burner apparatus S1 in the above described first embodiment. However, it is possible to employ the structure in which the internal structure and the connection structure of the pipe body 4 are placed in vertical symmetry relative to the burner apparatus S2 or S3 in the above described second or third embodiment or variant examples thereof.

INDUSTRIAL APPLICABILITY

As described above, according to a burner apparatus of the present invention, it is possible to improve the ignition performance of an ignition system, and to also generate high-temperature gas stably.

DESCRIPTION OF THE REFERENCE NUMERALS

S1, S2, S3 . . . . Burner apparatus
R1 . . . . Exhaust gas flow path
R2 . . . . Ignition chamber
N . . . . Combustion chamber
7 . . . . Ignition system
7a . . . . Tip section
7b . . . . Glow plug
7c . . . . Auxiliary heating portion
8 . . . . Partition member
10, 20 . . . . Windbreak cover (Windbreak device)
10a . . . . Through-hole
30 . . . . Plate member (Windbreak device)
X . . . . Exhaust gas (Oxidizing agent, Fluid)

What is claimed is:

1. A burner apparatus that combusts an air-fuel mixture of an oxidizing agent and fuel, the oxidizing agent including at least exhaust gas, the burner apparatus comprising:
   a supply flow path in which the exhaust gas flows;
   a combustion unit used to combust an air-fuel mixture therein, the combustion unit being connected to the supply flow path in a first direction different from a second direction in which the supply flow path extends;
   an ignition system including a heating portion which heats the air-fuel mixture to its ignition temperature or more;
   a partition member partitioning an interior of the combustion unit into an exhaust gas flow path in which the exhaust gas introduced from the supply flow path flows, an ignition chamber in which the heating portion is placed, and a combustion-holding chamber which is positioned between the ignition chamber and the supply flow path so as to communicate with the supply flow path and in which combustion of the air-fuel mixture ignited by the ignition system is maintained, so that the exhaust gas passes between the exhaust gas flow path and the ignition chamber and so that the air-fuel mixture passes between the ignition chamber and the combustion-holding chamber; and
   a windbreak device placed around the heating portion apart from the heating portion, and configured to reduce a flow speed of fluid which is supplied to the heating portion,
   wherein the heating portion includes a heat-generating source configured to generate heat, and an auxiliary heating portion which is configured to be heated to the ignition temperature or more by the heat-generating source, which is placed around the heat-generating source, and which includes an internal space allowing fuel to be kept therein,
   the partition member includes a plate separating the ignition chamber and the combustion-holding chamber,
   the heating portion, at least part of the plate, and the combustion-holding chamber are disposed in a line in the first direction, and
   the windbreak device is placed in the ignition chamber.

2. The burner apparatus according to claim 1, wherein the windbreak device is a plate member supported by the partition member.

* * * * *